United States Patent

[11] 3,579,846

| [72] | Inventor | Jean-Michel Catherin<br>Savigny-Sur-Orge, France |
|---|---|---|
| [21] | Appl. No. | 690,814 |
| [22] | Filed | Dec. 15, 1967 |
| [45] | Patented | May 25, 1971 |
| [73] | Assignee | Compagnie General D'Electricite<br>Paris, France |
| [32] | Priority | Dec. 15, 1966, June 5, 1967 |
| [33] | | France |
| [31] | | 87563 and 109148 |

[54] LASER GYROMETER SYSTEM
18 Claims, 3 Drawing Figs.

[52] U.S. Cl. .................................................. 33/204,
73/505, 356/106
[51] Int. Cl. ..................................................... G01c 21/00
[50] Field of Search........................................... 356/106,
28; 33/226, 226 (Z); 73/505; 74/5.6, 5.22

[56] References Cited
UNITED STATES PATENTS

| 2,981,113 | 4/1961 | Erdley | (33/226UX) |
| 3,316,768 | 5/1967 | Cook | 73/505 |
| 3,395,270 | 7/1968 | Speller | 73/505X |

*Primary Examiner*—James J. Gill
*Attorney*—Craig, Antonelli, Stewart and Hill

ABSTRACT: Variation of output frequency of a laser gyrometer, the plane of which rotates about a vertical axis, is utilized to ascertain the direction of geographical North. Adequate mechanical construction reduces several inaccuracies to a minimum.

INVENTOR
JEAN-MICHEL CATHERIN

BY Craig & Antonelli

ATTORNEYS

INVENTOR
JEAN-MICHEL CATHERIN

BY Craig + Antonelli

ATTORNEYS

LASER GYROMETER SYSTEM

The invention relates to a process and apparatus for determining the direction of the axis of the terrestrial poles, in particular by way of a laser gyrometer.

It is known that a laser gyrometer integral with a system in rotation supplies an output frequency which is linearly related to the speed of rotation. If the gyrometer turns in its plane with an angular speed (or pulsation) $\Omega$, the outgoing frequency $f$ therefrom takes the form:

$f = f_z \Delta f z \Delta f_a \jmath a$, with $\Delta f \Omega = k\Omega$, $f_a$ being a constant called the frequency of anisometry and existing for a zero speed of rotation of the gyrometer, and $\Delta f_a$ being an irregular fluctuation of the said frequency $f_a$, which occurs as a noise component.

Generally speaking, to determine a movement of plane rotation in space, a "rotation vector" $\Omega$, perpendicular to the plane in which the rotation takes place, is defined, having for intensity the pulsation $\Omega$ of the movement of rotation and oriented, for example, so that the speed of rotation vector is directed towards the left of an observer lying on the rotation vector. If the normal to the plane of the gyrometer forms an angle $\alpha$ with the rotation vector, the term $\Delta f \Omega$ in equation (1) is proportional to $\Omega \cos \alpha$: $\Delta f \Omega = K \cdot \Omega \cos \alpha$, where K is a coefficient in which several parameters occur including the surface of the gyrometer, the perimeter of the gyrometer, and the length of wave used. In other words, the term $\Delta f \Omega$ is proportional to the flux of the rotation vector in the plane of the gyrometer.

Let us consider a laser gyrometer placed in a plane parallel to the axis of the earth's poles. The flow of the terrestrial rotation vector $\Omega_o$ in the gyrometer is zero, the rotation of the earth is thus without effect on a gyrometer so placed. Let the gyrometer be placed in another orientation, for example, vertical. Let $\Omega'_o$ be the horizontal projection of the terrestrial rotation vector on the vertical. If the gyrometer be made to turn about a vertical axis, the term $\Delta f \Omega$ is maximum when the plane of the gyrometer is oriented perpendicularly to the line of the poles; and it is zero when the plane of the gyrometer is oriented parallel to the line of the poles. For a given orientation $\alpha$, one will have $\Delta f \Omega = k \Omega^{\cos} \alpha$.

The installation thus makes it possible to determine $\alpha$ and the direction of the geographical North.

According to the invention, a device for the determination of a reference direction on the Earth is characterized in that it comprises a laser gyrometer mounted so as to turn about an axis chosen so that the flux of the terrestrial rotation vector in the plane of the gyrometer may have a maximum value which varies sinusoidally in terms of the angle of rotation about the said axis, and means of measurement of the output frequency of the gyrometer. The precision of the measurement will be essentially limited primarily by the "noise" term $\Delta f_a$, considering the state of functioning of the laser gyrometers at the present level of the art.

The error on the measurement of $\alpha$ will be obtained by differentiating the expression of the frequency:

$\Delta f = -k\Omega^{\sin} \alpha \cdot 052558400 \Delta \alpha$ (with $\Delta \alpha$ in radians)

Whence one obtains:

$\Delta \alpha = -\Delta f / k \Omega_o \sin \alpha$

It will be seen from this expression that the measurements will have to be made in the vicinity of $\alpha = \pi/2$, that is to say, when the direction North passes through the plane of the gyrometer. Under these conditions, the term $\Delta f \Omega$ is near zero, and there remains for the error $\Delta f = \Delta f_a$.

By averaging the beat frequency over a period of about 10 minutes, it is possible to reduce $\Delta f_a$ to some 0.30 c./s., which corresponds more or less to a value of $\Delta f \Omega$ which would give a speed of rotation of 0.1° per hour: $\Delta f = k \cdot (0.1)°/hr$.

The speed of terrestrial rotation being of the order of 15° per hour, the limit of precision on $\Delta \alpha$ is given, in accordance with the above-given relationships (2), (3), (4) by $\Delta \alpha$ (radians) $= 0.1/15 = ^{radian}$ or about 23 minutes of arc. It is possible to improve on this precision by a dynamic method comprising a permanent rotation of the plane of the gyrometer and a synchronous detection of the signal obtained under these conditions.

It is in fact known that, to obtain a measurement value from a signal vitiated by a relatively intense level of noise, it is advantageous to impose a modulation on the signal by means of a reference signal which transposes the information onto a carrier signal of well-defined frequency and phase, in a region of the spectrum with relatively low noise, the modulated wave obtained being freed of a part of the noise components by filtering in a filter of B bandwidth, and then subjected to a synchronous detection under control of the said reference signal, the outgoing signal from the synchronous detector being thereby freed of the greater part of the residual noise components by a low-pass filter.

The method in accordance with the invention is carried into practice by a device of automatic detection of the direction North, comprising, a laser gyrometer turning about a vertical axis at a constant speed of F cycles per second, a means of recording the direction of orientation of the plane of the gyrometer, a frequency discriminator, a band-pass filter $$\left(F - \frac{B}{2} \text{ to } F + \frac{B}{2}\right)$$

a synchronous detector constituted by a reversing relay actuated twice per rotation of the laser, the polarity of the output signal of the said frequency discriminator, controlled by means operated twice per rotation, each time the the plane of the gyrometer passes before the said recording means, the output signal of the said relay passing through a low-pass filter which applies it to a control amplifier controlling, by means of a servomotor, the position of the said recording means.

An alternative arrangement according to the invention consists in making the plane of the laser gyrometer turn about a horizontal axis oriented in the East-West direction, which makes it possible to determine the latitude of the place. The apparatus based on this principle is capable, as a rule, of a very high degree of precision, but it has a certain number of limitations, the most important of which are mechanical in origin. The mechanical imperfections can have effects of two kinds:

1. variations of the angular speed of the system, which affect the synchronous detection and introduce an additional "noise" factor to it; and 2. displacements of the axis of rotation.

The principal aim of the contemplated alternative arrangement is the elimination, or at least the reduction, of the unfavorable effects on the precision of the gyrometer arrangement due to displacements of the axis of rotation. The only condition imposed on the axis of rotation of the gyrometer is that the flow of the terrestrial rotation vector in the plane of the gyrometer should not be permanently zero. Of the various possible forms of execution, the simplest is that which includes a vertical disposition of the axis of rotation. From the point of view of the kinematic quality, however, this solution is not the most advantageous.

It is in fact well known that, when a shaft turns about two fixed bearings, the real axis of rotation is not itself fixed, but undergoes a parasitic displacement (precession) which is generally periodic when the speed of rotation is uniform. These parasitic displacements of the axis of rotation, which, with the best data that can be obtained, may be of the order of a second of arc, impose on the angular speed of the gyrometer fluctuations which are of the order of the speed of rotation of the earth. It is therefore desirable to eliminate them.

A first measure for eliminating this problem consists in inclining the axis of rotation of the laser to the vertical. The result is that, under the action of the heavy masses present in the apparatus, a torque is exerted on the shaft of rotation, causing the contact of the upper shaft-generator with a well-defined and fixed point of the lower bearing and the contact of the lower generator with a well-defined and fixed point of the upper bearing. The deviations of position of the axis due to the imperfections of the bearings are thus eliminated. There remain only the deviations of position due to imperfections which may exist in the shaft, a part more simple in form and therefore susceptible of more accurate manufacture. The inclination of the axis of rotation to the vertical can, for example, be included between 20° and 50°, there being nothing critical in these values.

It is under such conditions that the advantageous features of the improvement constituting the subject matter of the invention are exerted, the aim of which is to eliminate the residual errors in known systems. These residual errors are of two kinds:

1. There is a possibility of error between the position of the optical reference and the real position of the normal to the plane of the gyrometer indicating the geographic North, because of the mechanical imperfections which affect the displacement of this reference in relation to the gyrometer.

2. The axis of rotation of the gyrometer likewise undergoes small deviations in relation to the theoretical position. These deviations, which are repeated periodically at the angular speed of the plane of the gyrometer $\omega$, constitute a function which can be developed in Fourier series, according to the harmonics of $\omega$. By suitably dimensioning the band-pass filter which is provided in the control system, the harmonics will be eliminated, only the component with a fundamental pulsation $\omega$ will pass to the control input. The result is that to the angular variation of pulsation $\omega$ is added a parasitic component of the same frequency, which finds expression in a phase displacement in relation to the theoretical value, the effect of this being to introduce a deviation between the real position of equilibrium of the normal to the plane of the gyrometer and its theoretical position.

According to the invention, in order to eliminate the first residual error, a rigid assembly is provided for support of the laser comprising on the one hand the rotation shaft of the gyrometer, preferably inclined to the vertical, on the other hand the detecting apparatus, this assembly being mounted on a common platform which can turn about an axis, preferably vertical, on a fixed base.

To eliminate the second residual error, according to another characteristic, the angular position of the gyrometer on its platform can be adjusted by hand.

The invention will now be described with reference to the accompanying drawings, which illustrate the invention but in no restrictive sense, and wherein.

Figure 1:
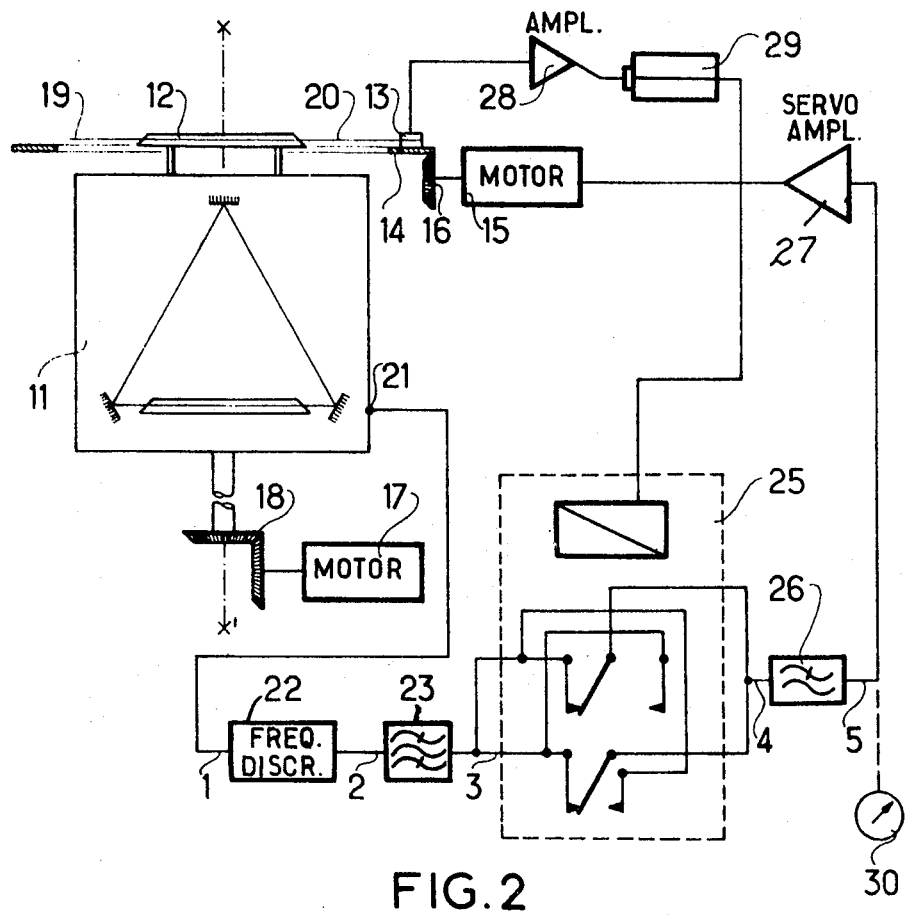
FIG. 1 is a diagram of the general principle of an example of a laser gyrometric compass according to the invention.
Figure 2:
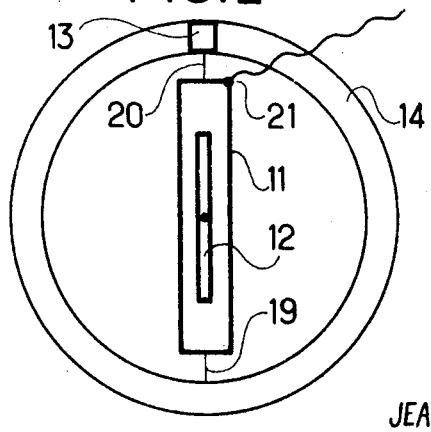
FIG. 2 is a plan view of the laser support constituting a part of FIG. 1.

In FIGS. 1 and 2, the same references are used to designate corresponding elements. A laser gyrometer 11 is brought into rotation at a frequency F about a vertical axis XX' by a motor 17 by way of gearing arrangement 18. The gyrometer is supplied with a source of light 12 emitting a horizontal beam in the two diametrically opposite directions 19 and 20. The source 12 can advantageously be a laser. A photodiscriminator 13 emits an electric impulse each time one of the beams 19 or 20 passes over it, that is to say twice per rotation of the gyrometer. This photodiscriminator 13 is mounted on a horizontal ring 14, which is independently adjusted as to position about the axis XX' under the control of a servomotor 15 by way of gearing arrangement 16.

By a rotating contact 21, shown schematically in the drawing, the beat frequency derived from the gyrometer is applied to a frequency discriminator 22 via line 1, the detection curve of the discriminator being centered on the said anisotropic frequency $f_a$. The signal detected by the frequency discriminator 22 traverses a band-pass filter 23, capable of passing a band $$\left(F - \frac{B}{2} \text{ to } F + \frac{B}{2}\right)$$

where B is the bandwidth of the filter. The outgoing signal from filter 23 is applied to the input of a synchronous detector provided, by way of example, in the form of a reversing relay 25. This relay 25 is controlled by a bistable flip-flop 29, which can be excited by an impulse coming from the photodiscriminator 13 applied through an impulse amplifier 28.

The signal transmitted by the synchronous detector 25 traverses a low-pass filter 26, the output of which is connected to the input of a control amplifier 27 which is connected to the servomotor 15 in control thereof.

Calling $\omega$ the angular frequency (pulsation) of the movement in rotation of the gyrometer, as seen in equation (1), at the input of the frequency discriminator 22 one has a frequency signal:

(1) $f = f_a + \Delta f_a(t) + \Delta f \Omega \cos \omega t$

At the output of the discriminator, as seen in equation (2), one has an electric signal $V_2$:

(2) $V_2 = V_a + \Delta V_a(t) + V\Omega \cos \omega t$

In equation (3), this signal has its spectrum limited in a B band $$\left(F - \frac{B}{2} \text{ to } F + \frac{B}{2}\right)$$

imposed by filter 23 to a value $V_3$ at the output of the filter:

(3) $V_3 = [aFV_a(t)]B + V\Omega \cos \omega t$

At input 4 to filter 26, the signal $V_3$ is obtained at the output of reversing relay 25 with polarity changed at each half-turn, in positions $\alpha_1$ and $\alpha_1 + \pi$.

In equation (5) one obtains the integral:

(5) $$V_5 = \frac{2}{\pi} \left[ \int_{\alpha 1}^{\alpha 1 + \pi} V_3 d\alpha - \int_{\alpha 1 + \pi}^{\alpha 1 + 2\pi} V_3 d\alpha \right]$$

If $\alpha_0$ is the position in the direction of North, one has:

$$V_5 = 2 \frac{V\Omega}{\pi} \sin(\alpha_1 - \alpha_0)$$

If the position of the reference 13 does not coincide with North (position $\alpha_0$), the servomotor 15 is excited until the reference 13 is brought into the proper position indicating the direction North ($\alpha_1 - \alpha_0 = 0$). The sensitivity of the measurement can be expressed by $$\frac{dV_5}{d\alpha} = \frac{2V\Omega}{\pi} \cos(\alpha_1 - \alpha_0)$$

that is to say that it will be a maximum for $\alpha_1 = \alpha_0$, whereas in the static method described above the sensitivity was maximum for $\alpha_1 = \pi/2$.

The width B of the band of filter 23 must be narrow enough to eliminate small amounts of noise attaining to levels of non-linearity of the circuits. The low-pass output filter 26 must also be as narrow as possible: a narrower band would give a more precise measurement, but, as the duration of the measurement increases at the same time, a compromise must be reached between the precision and the speed of measurement. With this device it is possible to obtain a determination of North to within a few minutes of arc in a time of the order of 2 to 3 minutes.

An installation has been described which functions automatically. The method is likewise applicable to a less elaborate arrangement wherein the control circuit, that is to say the parts 27, 15 and 16, is eliminated. In this case, the platform 14 would be turned by hand, observing the signal supplied by the synchronous detection by means of a voltmeter 30, the adjustment consisting of bringing the reading of the said voltmeter to zero.

The invention has been described in the most usual cases of application, for a gyrometer entrained by the earth. Other applications are possible within the scope of the invention, for example, mounting on board an artificial satellite.

Figure 3:
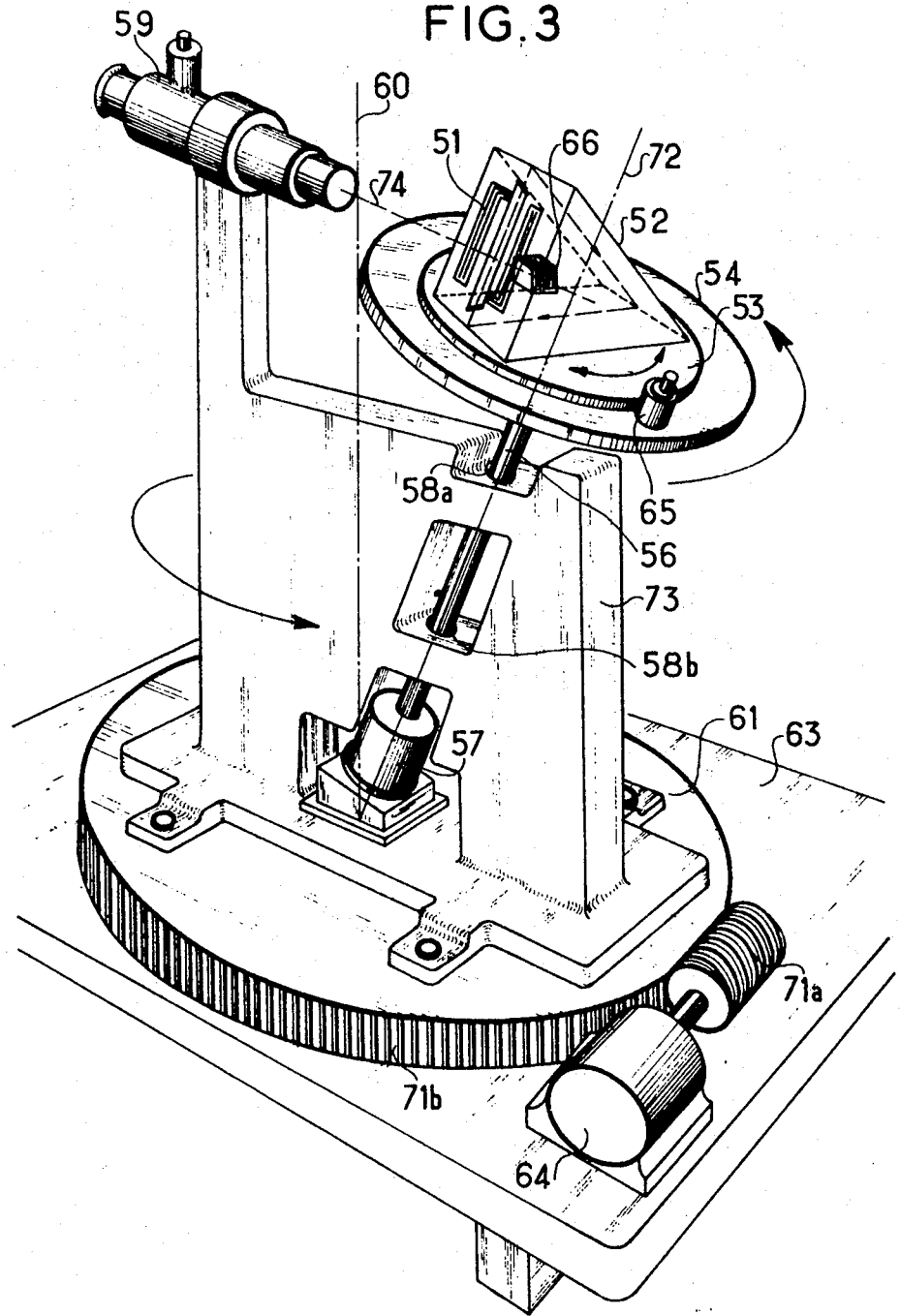
FIG. 3 shows in perspective an improved mode of carrying out the apparatus.

In FIG. 3, a laser gyrometer 51 is carried by a support 52 secured to a circular plate 53 which is rotatable about a central pivot (not shown) on a platform 54. The plate 53 can be secured to platform 54 by means of an element 65, for example, a clamping jaw fixed on platform 54, capable of clamping the edge of the plate 53. The gyrometer support 52 likewise carries a small plane mirror 66, the function of which will be explained below.

The platform 54 is mounted at the end of a rotatable shaft 56, for preference inclined to the vertical 60, driven by a motor 57 and supported by two bearings 58a and 58b. These two bearings are carried by a rigid structure 73, which is preferably very robust and on which is mounted, for example, an autocollimating telescope 59 cooperating with the mirror 66 carried by the gyrometer support: the autocollimating telescope 59 is equipped with a photodetector known per se.

The structure 73 is rigidly secured to a platform 61 which can turn about a pivot (not shown) carried by a fixed base 63. The platform 61 can be brought into rotation by a servomotor 64 by way of a speed-reducing gear constituted by two pinions 71a and 71b.

This control motor 64 is fed by means of a control line from a control system (not shown), one input of which is connected to the output of a photodetector in the telescope 59 and another input of which receives the outgoing signal from the gyrometer. This control system can, for example, be identical to that of FIG. 1. For purposes of avoiding repetition in the disclosure its detailed description will not be repeated. It should be noted that the axis 74 of the telescope 59, the vertical axis 60 and the axis 72 of the shaft of rotation 56 of the gyrometer are situated in the same plane.

The operation of the arrangement of FIG. 3 is the following:

The apparatus is initially adjusted for use in a place where the direction North is known with a high degree of precision, by astronomical observations for example. The apparatus is then put into operation. The support 73 will be displaced by the control motor 64. In a moment the telescope will be oriented in a direction which, in general, will not be in accordance with the line of the terrestrial poles. The position of the plate 53 on platform 54 will then be adjusted so as to bring the position of the telescope 59 exactly in line with the direction of the axis of the poles.

The apparatus thus adjusted can serve to log the direction of the terrestrial poles with a high degree of precision at any point of the globe. Naturally, the autocollimating telescope and its photodetector could be replaced by an equivalent apparatus within the scope of the invention.

I have shown and described several embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. Apparatus for determining a reference plane on a body rotating about a first axis, including: a laser gyrometer mounted on said body for rotation about a second axis such that the flux of the rotation vector of said body through the plane of said gyrometer varies with the angular position of said plane, drive means for rotating said gyrometer about said second axis, reference generating means having a portion mounted for rotation with said gyrometer and a portion fixed relative to said body for providing a reference output signal, discriminator means connected to the output of said gyrometer for converting the output beat frequency to a voltage, synchronous detector means connected to the output of said reference generating means and the output of said discriminator means for producing a signal indicative of the relative phase of said outputs, and means for moving a portion of said reference generating means that is fixed relative to said body for changing the phase of the output of said reference generating means to reduce said synchronous detector output signal to a null.

2. Apparatus as claimed in claim 1, in which said second axis is located in said gyrometer plane.

3. Apparatus as claimed in claim 1 in which said reference generating means includes a light source disposed on a plate serving as a base support for said gyrometer, and at least one photosensitive element disposed on a member fixedly mounted at said position on said body.

4. Apparatus as claimed in claim 3, in which said light source is a laser.

5. Apparatus as claimed in claim 3, in which said fixedly mounted member includes means for varying its orientation relative to said position.

6. Apparatus as claimed in claim 5, in which said means for varying the orientation includes a gear train driven by a servomotor.

7. Apparatus as claimed in claim 1, in which said frequency discriminator is connected at its output to a band-pass filter, the characteristic curve of the discriminator being centered on the constant frequency of anisotropy, and the passband of said filter being centered on the frequency of rotation of said gyrometer plane.

8. Apparatus as claimed in claim 1, in which said drive means includes a gear train driven by a servomotor, said synchronous detector means being connected to control the operation of said servomotor.

9. Apparatus as claimed in claim 8, including a platform on which is mounted said gyrometer and which is rigidly attached to a shaft arranged to be driven by a motor and supported in two bearings, and further including means for providing a torque on the shaft whereby one generatrix of a cylinder enveloping the shaft is maintained in contact with a fixed point in one bearing, and the diametrically opposite generatrix is maintained in contact with a fixed point on the other bearing.

10. Apparatus as claimed in claim 9, in which said means for providing the torque on said shaft includes a support for said bearings arranged to locate the axis of rotation of said shaft at an angle to the vertical.

11. Apparatus as claimed in claim 1 including a platform on which is mounted said gyrometer and which is rigidly attached to a shaft arranged to be driven by a motor and supported in two bearings.

12. Apparatus as claimed in claim 11, in which said platform is provided with a turntable on which said gyrometer is rigidly fixed, and with a fixing means for locking said turntable in a predetermined position relative to said platform.

13. Apparatus as claimed in claim 11, in which said motor for driving said shaft is mounted with said shaft and its supports on a rotatable disc and in which means are provided for positioning said disc with respect to said position on said body.

14. Apparatus as claimed in claim 13, in which said means for positioning the disc includes a second servomotor and a gear-train positioned to rotate the disc about its axis which is fixed with respect to said position on said body.

15. Apparatus as claimed in claim 14, including a marker means for providing signals indicative of the position of said gyrometer plane relative to said position on said body, including said synchronous detector means for comparing the frequency measured by said discriminator means with the frequency of the signal generated by said marker means, said servomotor being controlled by said synchronous detector means.

16. Apparatus as claimed in claim 15 in which the marker means includes an autocollimating telescope whose optical axis provides an indication of the gyrometer plane position yielding the preselected output position.

17. Apparatus as claimed in claim 16, in which said telescope is rigidly attached to said rotatable disc.

18. Apparatus as claimed in claim 16 in which the optical axis of the telescope, the axis of the gyrometer shaft and the lines of action of the forces providing torque on the gyrometer shaft are coplanar.